United States Patent
Richardson

(10) Patent No.: US 11,747,993 B2
(45) Date of Patent: Sep. 5, 2023

(54) OUT OF BAND DISK PERFORMANCE MONITORING TO MAINTAIN SOFTWARE DEFINED STORAGE PERFORMANCE

(71) Applicant: SOFTIRON LIMITED, Chilworth (GB)

(72) Inventor: Harry Richardson, Lamarsh (GB)

(73) Assignee: SOFTIRON LIMITED, London (GB)

( * ) Notice: Subject to any disclaimer, the term of this patent is extended or adjusted under 35 U.S.C. 154(b) by 0 days.

(21) Appl. No.: 17/459,244

(22) Filed: Aug. 27, 2021

(65) Prior Publication Data

US 2022/0066654 A1 Mar. 3, 2022

Related U.S. Application Data

(60) Provisional application No. 63/071,939, filed on Aug. 28, 2020.

(51) Int. Cl.
*G06F 11/30* (2006.01)
*G06F 3/06* (2006.01)

(52) U.S. Cl.
CPC .......... *G06F 3/0619* (2013.01); *G06F 3/0604* (2013.01); *G06F 3/0644* (2013.01); *G06F 3/0659* (2013.01); *G06F 3/0673* (2013.01); *G06F 11/3034* (2013.01)

(58) Field of Classification Search
CPC .. G06F 11/3034; G06F 3/0619; G06F 3/0604; G06F 3/0644; G06F 3/0659
See application file for complete search history.

(56) References Cited

U.S. PATENT DOCUMENTS

| | | | |
|---|---|---|---|
| 2013/0013953 A1 | 1/2013 | Eck et al. | 714/2 |
| 2017/0090779 A1 | 3/2017 | Barzik et al. | 711/162 |
| 2018/0060193 A1 | 3/2018 | Knauft et al. | |
| 2021/0240362 A1* | 8/2021 | Soryal | G06F 3/0637 |

FOREIGN PATENT DOCUMENTS

JP 2004512630 * 4/2004

OTHER PUBLICATIONS

International Search Report and Written Opinion, Application No. PCT/EP2021/073 916, 21 pages, dated Dec. 20, 2021.

* cited by examiner

*Primary Examiner* — Nadeem Iqbal
(74) *Attorney, Agent, or Firm* — Slayden Grubert Beard PLLC

(57) ABSTRACT

An article of manufacture includes a non-transitory machine-readable medium. The medium includes instructions. The instructions, when loaded and executed by a processor, configure the processor to, from an operating system, determine that a software defined storage (SDS) application installed in the operating system is configured to access a disk. The disk includes an SDS partition. The instructions are further configured to cause the processor to determine that the disk is to be monitored for performance and access a monitoring partition on the disk. The monitoring partition is inaccessible to the SDS application. The instructions are further configured to cause the processor to write test data to the monitoring partition and validate the test data written to the monitoring partition.

18 Claims, 2 Drawing Sheets

OUT OF BAND DISK PERFORMANCE MONITORING TO MAINTAIN SOFTWARE DEFINED STORAGE PERFORMANCE

PRIORITY

This application claims priority to U.S. Provisional Patent Application No. 63/071,939 filed Aug. 28, 2020, the contents of which are hereby incorporated in their entirety.

FIELD OF THE INVENTION

The present disclosure relates to monitoring of operation of electronic devices and, more particularly, to out-of-band disk performance monitoring to maintain software-defined storage performance.

BACKGROUND

Typical solutions for monitoring the quality of hard drive performance can be implemented as software that is operating on one of any suitable file system or driver system, such as Windows or Linux. However, inventors of embodiments of the present disclosure have discovered that certain software defined storage (SDS) schemes, such as Ceph, that address hard drives directly or at a level lower than the operating system or independently thereof, are incompatible with such solutions for monitoring the quality of hard drive performance.

DETAILED DESCRIPTION

Embodiments of the present disclosure may include an apparatus. The apparatus may be implemented in any suitable manner, such as by digital circuitry, analog circuitry, instructions for execution by a processor, or any suitable combination thereof. For example, the apparatus may include an article of manufacture. The article of manufacture may include a non-transitory machine-readable medium. The medium may include instructions. The instructions, when loaded and executed by a processor, configure the processor to execute operations of the apparatus.

In combination with any of the above embodiments, the apparatus may be implemented as or within an operating system.

In combination with any of the above embodiments, the apparatus may be configured to, from an operating system, determine that an SDS application installed in the operating system is configured to access a disk. The disk may be implemented in any suitable manner for a storage medium. The disk may include an SDS partition. The apparatus may be configured to determine that the disk is to be monitored for performance. The apparatus may be configured to access a monitoring or dedicated performance partition on the disk. The monitoring or dedicated performance partition may be inaccessible to the SDS application. The apparatus may be configured to write test data to the monitoring or dedicated performance partition. The apparatus may be configured to validate the test data written to the monitoring or dedicated performance partition.

In combination with any of the above embodiments, the apparatus may be configured to create the monitoring partition on the disk.

In combination with any of the above embodiments, the apparatus may be configured to allow SDS data to be written from the SDS application through an SDS file system to the SDS partition.

In combination with any of the above embodiments, the apparatus may be configured to block access by the SDS application to the monitoring partition.

In combination with any of the above embodiments, the apparatus may be configured to allow test data to be written to the monitoring partition out-of-band with respect to an operating system file system, and to otherwise block the operating system file system from the monitoring partition.

In combination with any of the above embodiments, the apparatus may be configured to include the functionality for writing test data to the monitoring partition in a partition monitor, wherein the apparatus is further configured to block the partition monitor from accessing the SDS partition.

In combination with any of the above embodiments, the validation of the test data may be a benchmark of write operations to the disk configured to characterize health of the disk, such as whether the disk has failed or is expected to fail within a given time period or operations.

Figure 1:
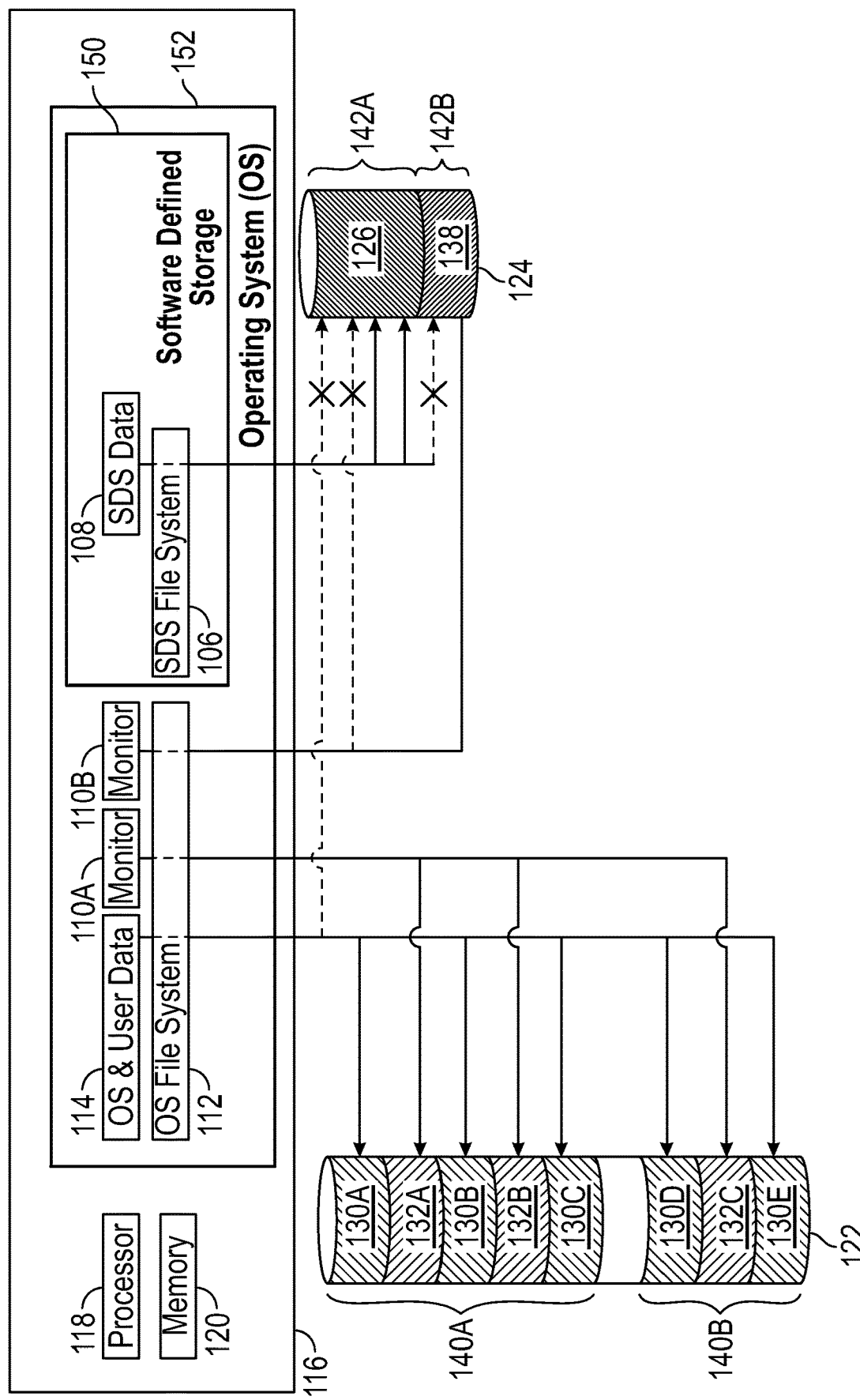
FIG. 1 is an illustration of an example system for out-of-band disk performance monitoring to maintain software defined storage performance, according to embodiments of the present disclosure.

FIG. 1 is an illustration of an example system 100 for out of band disk performance monitoring to maintain SDS performance, according to embodiments of the present disclosure.

System 100 may include any suitable number and kind of elements. For example, system 100 may include an electronic device 116. Electronic device 116 may be configured to monitor any suitable number of hard drives, such as hard drive 122 or hard drive 124.

Electronic device 116 may be implemented in any suitable manner. For example, electronic device 116 may include one or more processors 118 communicatively coupled to one or more memories 120. Memories 120 may include instructions. The instructions, when loaded and executed by processor 118, may cause operation of various functionality of electronic device 116 as described herein. Electronic device 116 may include an operating system (OS) 152. OS 152 may include a set of programs, such as an OS file system 112, that is responsible for reading, writing, and deleting data on the drive.

Hard drives 122, 124 may be implemented in any suitable manner, including a rotating drive, platter-based disk drives, solid-state drive, a physical hard drive, or any suitable mechanism. Hard drives 122, 124 may be used in computing systems to store data. Hard drives 122, 124 may be broken into sections, or partitions, to create areas for different functions. In a typical system there may be, for example, boot data, OS data, or user data. The partitioning may allow OS 152 to associate information with a particular use of the partition. For example, a hard drive might be commonly partitioned with a boot partition to be used to initialize the system. A hard drive might be also commonly partitioned with an OS partition, for OS data and user data. Alternatively, the OS data and user data may be allocated to separate partitions. A Master Boot Record (MBR) or equivalent structure may be typically used to store the partition information. Data may be stored on a hard drive in blocks. A function of a file system, such as OS file system 112, may be to break the file data into blocks and write them to the correct partition. OS file system 112 may be responsible for keeping track of which blocks are in use on which partition though, for example in the Windows operating system, a File Allocation Table (FAT). In other operating systems, such as Linux, equivalent structures may be used. When a partition is created, its information may be written to the MBR (or equivalent structure), and a FAT (or equivalent structure) may be created for the partition. When a request is received to write new data, OS file system 112 may be configured to determine which partition within a given drive and, and to determine where within that partition of the given drive, that there is free space available to store the data.

In the example of FIG. 1, hard drive 122 may be configured to store information by OS 152. Initially, hard drive 122 might be partitioned into one or more partitions, such as partitions 140A and 140B. These may be used, for example, for a partition for boot data (140B) and a partition for OS and user data (140A). OS 152 may be configured to use its OS file system 112—which is part of the OS—to access the various partitions of hard drive 122. File system 112 may be configured to keep a record of which portions of the partition have been used. Data to be written to hard drive 122 may include OS or user data 114, such as data created by an application or for the operation of OS 152. When OS or user data 114 is added to a partition, file system 112 may be configured to find an empty location from its stored list of used locations, and then write the data 114. File system 112 may be configured to select from partitions that have been allocated to such purposes by OS 152.

Electronic device 116 may be configured to monitor operation of hard drives 122, 124 through use of various monitoring software as described herein. System 100 may include any suitable number and kind of monitoring components to monitor the performance of hard drives 122, 124. For example, system 100 may include monitor circuits 110. Monitor circuits 110 may be implemented in any suitable manner, such as by analog circuitry, digital circuitry, instructions for execution by a processor (such as processor 118), or by any suitable combination thereof. Monitor circuits 110 may be referred to herein simply as monitors 110. Monitors 110, when implemented by monitoring software, may be implemented by instructions and memories 120 for execution by processors 118. Monitors 110 may be implemented within any suitable operating environment, such as OS 152. For example, monitor 110A may run sequentially within OS file system 112. Monitor 110A may be configured to write data to hard drive 122, read back the previously written data, and validate the data. OS file system 112 may be configured to control where the data for monitor 110A is written such that any data writes do not overwrite any existing OS or user data 114. This may result in a separation of OS or user data 130A, 130B and 130C on partition 140A and OS or user data 130D, 130E on partition 140B. Monitor data 132A, 132B may be kept in partition 140A while monitor data 132C may be kept on partition 140B. Each instance of monitor data 132 may thus be kept separate from OS or user data on hard drive 122.

However, in SDS 150, OS file system 112 may be superseded and not used, and implementation within or use of OS file system 112 by SDS 150 might not be performed. SDS 150 may be configured to run as a self-contained application within OS 152. SDS 150 may utilize its own file system, SDS file system 106. SDS 150 may utilize its own data, SDS data 108, that is specifically targeted for use in a partition of hard drive 124. Hard drive 124 may include a space 126 for SDS data. Typically, an SDS may use the whole storage space of a hard drive in a single partition. SDS file system 106 may be responsible for managing the location of all of SDS Data 108 and finding unused space for new data. Since it is independent of OS file system 112, OS file system 112 might have no capability to find or locate SDS data 108 in hard drive 124 in space 126. Hard drive 124 might not include a partition specifically for OS file system 112, accessible for OS file system 112, or otherwise usable by OS file system 112. Therefore, OS file system 112 cannot reliably locate any unused blocks in space 126 to allow new data to be written by OS file system 112 and applications (such as monitor 110A) running thereon. As such, OS file system 112 cannot reliably operate a standard monitor program to perform independent benchmark analysis or other writes to SDS space 126.

To resolve this, in one embodiment, hard drive 124 may be split into two partitions—142A and 142B. OS 152 may create partitions 142A, 142B. Partition 142A may be allocated by OS 152 to SDS file system 106. Partition 142B may be allocated to OS file system 112 by OS 152. Moreover, partition 142B may be allocated to OS file system 112 solely for the purposes of monitoring, such as independent benchmark analysis. SDS data space 126 may be created in the entirety of partition 142A and may be solely allocated to SDS file system 106. Similarly, a data space 138 may be created on partition 142B and be solely allocated by OS 152 to OS file system 112. OS 152 may be configured to format partition 142B. SDS 150 may be configured to format partition 142A. OS file system 112 may allocate access rights to applications using ACLs, including placement of OS or user data 114 into data spaces 130A, 130B, 130C, 130D, and 130E. SDS 150 may assign an object storage daemon (OSD) to data space 126 and use other SDS components, such as CRUSH and placement groups, to route data access from SDS 150 via the OSD.

Electronic device 116 may include another monitor instance, such as monitor 110B, that may be executed using OS file system 112. Monitor 110B may be configured to access partition 142B of hard drive 124 to perform benchmark analysis of hard drive 124. Since SDS file system 106 cannot access monitor partition 142B or data space 138, SDS 150 cannot interfere with any operations of OS file system 112. Conversely, SDS file system 106 might only use partition 142A and data space 126. SDS file system 106 might not be able to view, or even know of partition 142B. Furthermore, monitor 110B cannot interfere with any SDS data 108 stored in hard drive 124 in partition 142A or its data space 126. Monitor program 110B might not be able to interfere with this data as it does not have access to partition 142A or data space 126. Monitor 110B and OS file system 112 might not be able to view, or even know of partition 142A. Consequently, this may allow monitor 110B to operate simultaneously and independently of SDS 150 and SDS file system 106 in an isolated data space 138.

Each hard drive that is to be monitored by monitors 110 may include a particular partition reserved for use by monitoring software such as monitors 110. In one embodiment, a given hard drive may be monitored by an individual instance of monitor 110. In another embodiment, an individual instance of monitor 110 may be configured to monitor such partitions in multiple hard drives. Monitor partitions may be relatively small, such as simply large enough to accommodate the minimum size of rights or reads that are to be used as part of the monitoring process.

Thus, monitors 110 may utilize dedicated partitions to measure performance of hard drives 122, 124 against specific limits. Monitors 110 can operate continuously as they might not interfere with the file operations of SDS 150. Monitors 110 may also use the native file system 112 of OS 152 without having to operate through SDS 150 or its file system 106. Thus, monitors 110 may be configured to monitor hard drive 124 in an out of band manner with respect to SDS 150, as SDS 150 is unaware of the operations of monitors 110.

In operation, OS file system 112 may configure and partition hard drive 122. OS file system 112 may partition hard drive 122 into partitions 140A, 140B. OS file system 112 may divide partition 140A into data spaces 130A, 132A, 130B, 132B, 130C. OS file system may divide partition 140B into data spaces 130D, 132C, 130E.

OS file system 112 may partition hard drive 124 into partitions 142A, 142B. OS 152 may be configured to assign rights to these partitions in any suitable manner, such as by Access Control Lists (ACLs). The ACLs may be written by OS 152 into any suitable location. Partition 142B may be made available to OS file system 112 by virtue of the rights assigned by OS 152. Similarly, partition 142A may be made available to SDS 150. By withholding access through ACL entries, OS file system 112 may not make partition 142B available for OS or user data in OS 152 or OS file system 112. Moreover, using ACLs, OS 152 may obscure the existence of partition 142B from conventional mechanisms that facilitate the use of hard drives by elements (such as other applications) of OS 152, such as a FAT. The existence of partition 142B might be only communicated to monitor 110B through ACLs. Further, through the use of ACLs, the existence of partition 142B might not be communicated to SDS 150.

Monitor 110A may make writes of data to data spaces 132A, 132B, 132C. Such writes may be of any suitable test, calibration, validation, or characterization data. For example, any suitable Self-Monitoring, Analysis and Reporting Technology (SMART) tests, or any suitable equivalent, may be performed. Moreover, makers of hard disks may include their own internal or external testing software or protocols. Monitor 110A may evaluate the performance of writes of data to data spaces 132A, 132B, 132C. Monitor 110A may read the data that was written to data spaces 132A, 132B, 132C. Similarly, monitor 110B can execute read and write performance measurements using data space 138. The time needed to write the data may be recorded and benchmarked. If the data is successfully written within an allotted time, then the disk performance may be validated. If the data is not written within a sufficient amount of time, monitors 110 may take any suitable corrective action. This may include, for example, alerting a user of system 100, marking the partition as invalid, marking the disk as about to fail, marking the disk as failed, rewriting the data and reviewing the results again, or any other suitable action.

In one embodiment, the testing performed by monitors 110 may be non-destructive testing. In non-destructive testing, no existing user data might be overwritten during the tests. For example, OS file system 112 may allocate access of data spaces 132A, 132B, 132C to monitor 110A using ACLs. This may ensure that data for another process is not overwritten.

In another embodiment, destructive testing may be performed by monitors 110. In destructive testing, the test may overwrite user data on the drive. Destructive data testing may be performed by an OS-launched application or directly by a drive itself using SMART controls, bypassing OS 152. Monitor 110B may be configured to perform destructive testing. Accordingly, OS 150 may assign data space 138 to monitor 110B. Monitor 110B may be configured to bypass OS file system 112 (and the protections of various disk areas therein) and write directly to disk 124. As this may destroy any existing data, OS 152 may assign data space 138 to monitor 110B, wherein data space 138 is otherwise empty of user data.

Destructive testing may have advantages over non-destructive testing. More sectors or locations of the disk may be tested using destructive testing when, for example, random locations on the drive are selected as part of the destructive testing. If OS 152 allowed monitor 110B to perform destructive testing upon data space 126, monitor 110B, having no access to the information about which portions of data space 126 are to be used for user data, might overwrite user data. Accordingly, data space 138 may instead be used for destructive testing.

As discussed above, SDS 150 may have access rights to data space 126 and not to data spaces 130A, 132A, 130B, 132B, 130C, 130D, 132C, 130E. That SDS 150 does not use OS file system 112 to access data space 126 means that SDS 150 cannot safely perform testing on disk space 124. SDS 150 cannot safely perform testing because OS 152 cannot determine what data is being used because it cannot decode the file system that SDS 150 is using. Although OS 152 is the entity that has the authority to grant access to partition 142A to SDS 150, OS 152 (and thus monitors 110) may have no visibility into partition 142A and what data locations therein are in use. Thus, partition 142B may instead be used for testing by monitor 110B. To OS 152 (and thus monitors 110), partition 142A may appear, in essence, as an unformatted partition.

Figure 2:
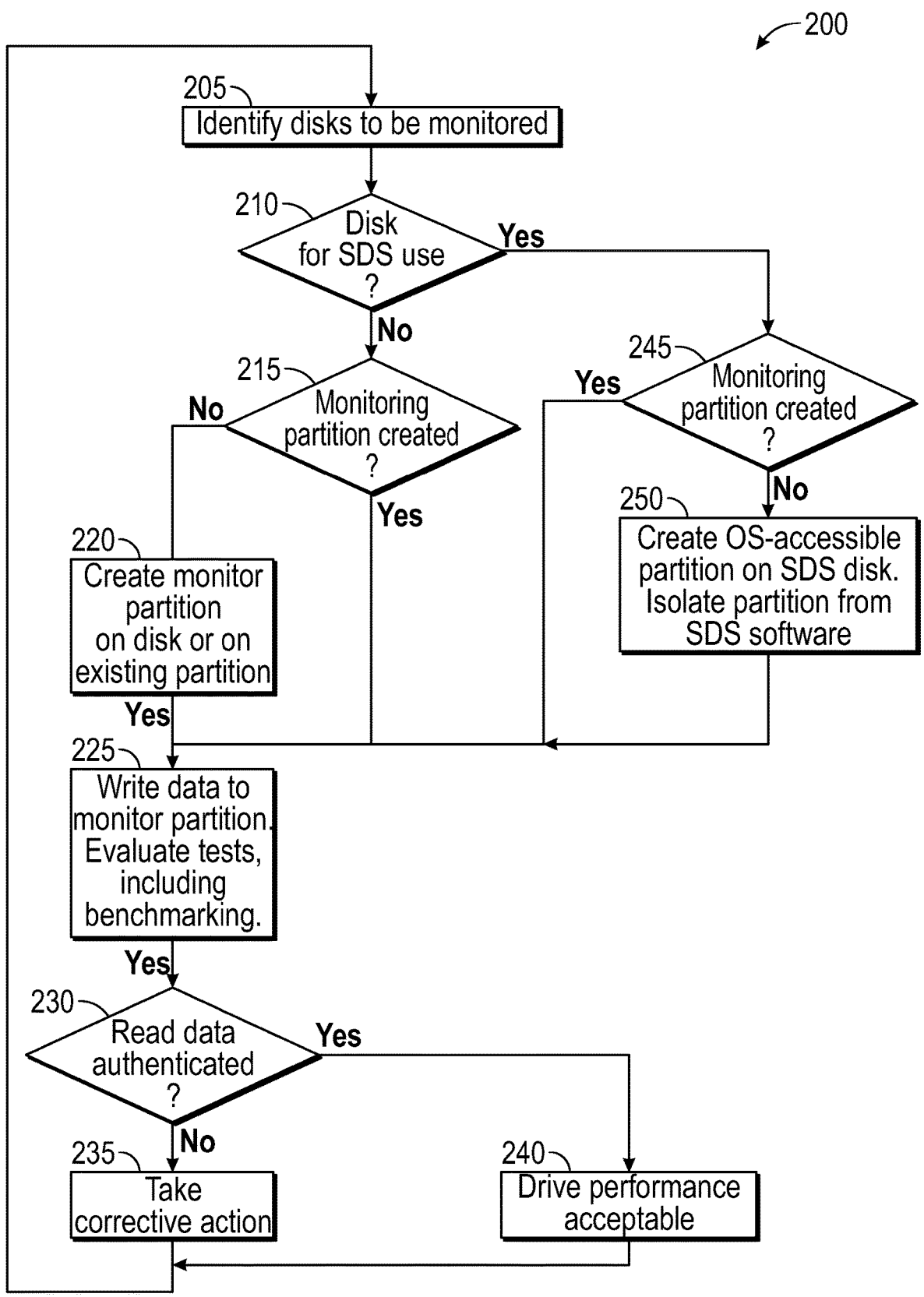
FIG. 2 is an illustration of an example method for out of band disk performance monitor to maintain software defined storage performance, according to embodiments of the present disclosure.

FIG. 2 is an illustration of an example method 200 for out of band disk performance monitoring, according to embodiments of the present disclosure. Method 200 may begin at any suitable step. The steps of method 200 may be optionally repeated, omitted, performed in parallel, performed recursively, performed with more or fewer steps than shown in FIG. 2, or performed in any suitable order. Method 200 may be performed by any suitable system, such as system 100.

At step 205, disks to be monitored may be identified.

At step 210, for a given disk, it may be determined whether the given disk is for SDS use. If so, method 200 may proceed to step 240. Otherwise, method 200 may proceed to step 215, wherein the disk is to be used by normal operating system components.

At step 215, it may be determined whether a monitoring partition has been created for the given disk. If so, method 200 may proceed to step 225. Otherwise, method 200 may proceed to step 220.

At step 220, a monitoring partition may be created on the given disk. In some cases, a monitoring space may be created on an existing partition.

At step 225, test data may be written to the monitoring partition. The test data may be made as part of any suitable test. The test data may be used for benchmarking, for example. The test results may be evaluated.

At step 230, it may be determined whether the tests performed in step 225 have acceptable results. For example, if the test results show that disks are about to fail, or have failed, the test results may be unacceptable. If the test results are acceptable, method 200 may proceed to step 240. At step 240, reports or other suitable action may be taken to inform the system that the disk is running correctly. Method 200 may proceed to 205 to monitor additional disks or the same disk. Otherwise, if the test results are not acceptable, method 200 may proceed to step 235.

At step 235, any suitable corrective action may be taken in response to the failure of the read data to be authenticated. Method 200 may proceed to step 205.

At step 245, it may be determined whether a monitoring partition, independent of SDS software, exists on the SDS disk. If not, method 200 may proceed to step 250. Otherwise, method 200 may proceed to step 225, wherein test data will be written to the monitoring partition. At step 250, a partition may be created on the SDS disk. The partition may be accessible to an operating system monitor, but not accessible to the SDS. The partition may thus be isolated from SDS software. Method 200 may proceed to step 225, wherein test data will be written to the newly created monitoring partition.

Those in the art will understand that a number of variations may be made in the disclosed embodiments, all without departing from the spirit and scope of the invention, which is defined solely by the appended claims.

What is claimed is:

1. An article of manufacture, comprising a non-transitory machine- readable medium including instructions, the instructions, when loaded and executed by a processor, configure the processor to, from an operating system:
   determine that a software defined storage (SDS) application installed in the operating system is configured to access a first disk, the first disk including an SDS partition;
   determine that the first disk is to be monitored for performance;
   access a monitoring partition on the first disk, the monitoring partition inaccessible to the SDS application;
   write test data to the monitoring partition; and
   validate the test data written to the monitoring partition.

2. The article of claim 1, further including instructions configured to cause the processor to create the monitoring partition on the first disk.

3. The article of claim 1, further including instructions configured to cause the processor to:
   allow SDS data to be written from the SDS application through an SDS file system to the SDS partition; and
   block access by the SDS application to the monitoring partition.

4. The article of claim 1, further including instructions configured to cause the processor to:
   allow test data to be written to the monitoring partition out-of-band with respect to an operating system file system; and
   otherwise block the operating system file system from the monitoring partition.

5. The article of claim 1, wherein:
   the instructions for writing test data to the monitoring partition are included in a partition monitor; and
   the article further includes instructions configured to cause the processor to block the partition monitor from accessing the SDS partition.

6. The article of claim 1, wherein the validation of the test data is a benchmark of write operations to the first disk configured to characterize health of the first disk.

7. A system, comprising:
   a software defined storage (SDS) application;
   a hard drive, including:
      an SDS partition accessible to the SDS application; and
      a dedicated performance partition;
   an electronic device, including:
      one or more processors;
      one or more memories; and
      an operating system including an operating system file system and including instructions in the one or more memories to be loaded by the one or more processors;
   a monitor including instructions in the memory to be loaded by the processor, the instructions, when loaded by the one or more processors, configure the monitor to perform a benchmark monitoring process on the hard drive by accessing the dedicated performance partition; wherein:
      the monitor is configured to operate in the operating system and to access the dedicated performance partition through the operating system file system; and
      the SDS application is configured to access the SDS partition out of band with respect to the operating system and the operating file system.

8. The system of claim 7, wherein the dedicated performance partition is inaccessible to the SDS application.

9. The system of claim 7, wherein the operating system further includes instructions configured to cause the processor to create the dedicated performance partition on the first disk.

10. The system of claim 7, wherein the operating system further includes instructions configured to cause the processor to:
    allow SDS data to be written from the SDS application through an SDS file system to the SDS partition; and
    block access by the SDS application to the dedicated performance partition.

11. The system of claim 7, wherein the operating system further includes instructions configured to cause the processor to:
    allow test data to be written to the dedicated performance partition out-of-band with respect to the operating system file system; and
    otherwise block the operating system file system from the dedicated performance partition.

12. The system of claim 7, wherein the operating system further includes instructions configured to cause the processor to block the monitor from accessing the SDS partition.

13. A method, comprising:
    from an operating system:
       determining that a software defined storage (SDS) application installed in the operating system is configured to access a first disk, the first disk including an SDS partition;
       determining that the first disk is to be monitored for performance;
       blocking a monitor application from accessing a monitoring partition on the first disk; and
       allowing the monitor application to access the monitoring partition;
    from the monitor application:
       accessing a monitoring partition on the first disk;
       writing test data to the monitoring partition; and
       validating the test data written to the monitoring partition.

14. The method of claim 13, further comprising, from the operating system, creating the monitoring partition on the first disk.

15. The method of claim 13, further comprising, from the operating system:
    allowing SDS data to be written from the SDS application through an SDS file system to the SDS partition; and
    blocking access by the SDS application to the monitoring partition.

16. The method of claim 13, further comprising, from the operating system:
   allowing test data to be written to the monitoring partition out-of-band with respect to an operating system file system; and
   otherwise blocking the operating system file system from the monitoring partition.

17. The method of claim 13, further comprising, from the operating system, blocking the monitoring application from accessing the SDS partition.

18. The method of claim 13, wherein the validation of the test data is a benchmark of write operations to the first disk configured to characterize a health of the first disk.

\* \* \* \* \*